US012371595B2

(12) United States Patent
Kanderski et al.

(10) Patent No.: US 12,371,595 B2
(45) Date of Patent: Jul. 29, 2025

(54) METALLOCENE POLYOLEFIN BASED LOW ACTIVATION TEMPERATURE HEAT SEAL HOT MELT ADHESIVE

(71) Applicant: Bostik, Inc., Wauwatosa, WI (US)

(72) Inventors: Monina D. Kanderski, Milwaukee, WI (US); Michael D. Vitrano, West Allis, WI (US)

(73) Assignee: Bostik, Inc., Wauwatosa, WI (US)

( * ) Notice: Subject to any disclaimer, the term of this patent is extended or adjusted under 35 U.S.C. 154(b) by 428 days.

(21) Appl. No.: 15/004,312

(22) Filed: Jan. 22, 2016

(65) Prior Publication Data

US 2016/0215176 A1    Jul. 28, 2016

Related U.S. Application Data

(60) Provisional application No. 62/106,988, filed on Jan. 23, 2015.

(51) Int. Cl.
*C09J 123/08* (2006.01)
*B32B 27/08* (2006.01)
(Continued)

(52) U.S. Cl.
CPC ......... *C09J 123/0815* (2013.01); *B32B 27/08* (2013.01); *B32B 27/32* (2013.01);
(Continued)

(58) Field of Classification Search
None
See application file for complete search history.

(56) References Cited

U.S. PATENT DOCUMENTS

| 4,427,744 A | | 1/1984 | Hume, III |
| 5,141,801 A | * | 8/1992 | Takeshita ................... C08J 5/18 |
| | | | 428/348 |

(Continued)

FOREIGN PATENT DOCUMENTS

| EP | 341188 B1 | 8/1989 |
| EP | 0341188 A2 | 11/1989 |

(Continued)

OTHER PUBLICATIONS http://www.matweb.com/search/datasheet.aspx?matguid=f357ec3a6d544ec4b566efb94ab53f52 (Year: 2018).*

(Continued)

*Primary Examiner* — Samir Shah
(74) *Attorney, Agent, or Firm* — Tim Krogh

(57) ABSTRACT

A low activation temperature heat seal hot melt adhesive for packaging applications based on a blend of metallocene catalyzed polyolefin polymer, tackifying resin, wax and other optional additives. In order to achieve the high viscosity suitable for an extrusion heat seal application, the adhesive composition of the invention is highly loaded with polymer, and thus should have a viscosity of about 50,000 centipoise or more measured at a temperature of 300° F. Accordingly, the hot melt adhesive composition contains about 50% to about 90% by weight of metallocene catalyzed polyolefin polymer, about 5% to about 50% by weight of tackifying resin, about 0.5% to about 40% by weight of wax, about 0.1% to about 5% by weight of a stabilizer or antioxidant, and 0% to about 25% by weight of optional additives. The hot melt adhesive composition must have an activation temperature of about 160° F. or less, and provide a minimum peel force of about 1.0 pound per inch in order to meet the sealing performance requirements for packaging food and other consumer goods.

18 Claims, 5 Drawing Sheets

(51) Int. Cl.
B32B 27/32 (2006.01)
C08K 5/00 (2006.01)
C08L 91/06 (2006.01)

(52) U.S. Cl.
CPC ............ B32B 27/327 (2013.01); C08K 5/005 (2013.01); C08L 91/06 (2013.01); *B32B 2250/242* (2013.01); *B32B 2439/70* (2013.01); *C08L 2203/162* (2013.01)

(56) References Cited

U.S. PATENT DOCUMENTS

| | | | |
|---|---|---|---|
| 5,530,054 | A | 6/1996 | Tse et al. |
| 5,548,014 | A | 8/1996 | Tse et al. |
| 6,015,524 | A | 1/2000 | Kuder et al. |
| 6,107,430 | A | 8/2000 | Dubois et al. |
| 6,872,279 | B1 | 3/2005 | Kolowrot et al. |
| 8,076,422 | B2 | 12/2011 | Heemann et al. |
| 8,288,479 | B2 | 10/2012 | Akai et al. |
| 8,476,359 | B2 | 7/2013 | Wang |
| 9,181,461 | B2 | 11/2015 | Wang |
| 9,273,202 | B2 | 3/2016 | Hoya et al. |
| 9,284,475 | B2 | 3/2016 | Musacchi et al. |
| 9,587,094 | B2 | 3/2017 | Maeyama et al. |
| 10,005,934 | B2 | 6/2018 | Himmelberger et al. |
| 2004/0077759 | A1 | 4/2004 | Bardiot et al. |
| 2008/0190541 | A1 | 8/2008 | Terfloth et al. |
| 2010/0256274 | A1 | 10/2010 | Heemann et al. |
| 2011/0213067 | A1 | 9/2011 | Moeller et al. |
| 2012/0165455 | A1* | 6/2012 | Vitrano .................. C08L 23/06 524/505 |
| 2012/0259050 | A1* | 10/2012 | Vitrano .............. C09J 123/0815 524/293 |
| 2014/0023870 | A1* | 1/2014 | Takamori .......... C09J 123/0853 524/275 |
| 2016/0130480 | A1 | 5/2016 | Kauffman et al. |

FOREIGN PATENT DOCUMENTS

| | | |
|---|---|---|
| JP | 2004284575 A2 | 10/2004 |
| JP | 2010195402 A2 | 9/2010 |
| WO | WO2009074450 A1 | 6/2009 |
| WO | WO 2012/138689 A2 | 10/2012 |
| WO | WO 2012149391 A1 | 11/2012 |
| WO | WO 2014/046834 A1 | 3/2014 |
| WO | WO 2014/105244 A1 | 7/2014 |

OTHER PUBLICATIONS

PCT Search Report mailed Apr. 20, 2016 for the corresponding PCT International Application No. PCT/US2016/014483.
PCT Written Opinion mailed Apr. 20, 2016 for the corresponding PCT International Application No. PCT/US2016/014483.
S. Schaible et al., "Basic Study on the Evaluation of Thermoplastic Polymers as Hot-Melt Adhesives for Mixed-Substrate Joining", Open Journal of Applied Sciences, Aug. 31, 2016, 6, pp. 579-592.
Sasol—"Sasolwax H1 Fischer-Tropsch Hard Wax in Hot Melt Adhesives"; Jun. 2016—pp. 1-2.
Ataman Chemicals—"SASPLWAX-H1" pp. 1-6.
Baker Hughes—Polywax Polyethylenes Specialty Polymers and Waxes to Meet Your Needs—pp. 1-2.
Taylor Francis Online—Journal of Adhesion Science and Technology—"Thermally Activated Pressure-Sensitive Adhesives"; Yadunandan L. Dar., et al.—vol. 21, 2007—Issue 16. pp. 1-3.
Sasol—Product Data Sheet—: Sasolwax H1—Code 1550 Revision 18 Mar. 27, 2019—p. 1.
Chemie. De—"Paraffin" 1997-2014 Chemie. De Information Service GmbH; pp. 1-3.
Kador & Partner—European Patent Office—K 72 079 A/20se—Opposition Against European Patent 3 247 758 16 703 681.3 Metallocene Polyolefin Based Low Activation Temperature Heat Seal Hot Melt Adhesive. Patentee Bostik Inc., Opponent 1: Borealis AG; Opponent II—Henkel AG & Co. KG.
DexPlatomers—"Exzct 8230 Octene-1 Plastomer" Data Sheet p. 1-2.
Strouse—"Your Guide to Heat Activated Adhesives" (https://www.strouse.com/blog activated-adhesives) pp. 1-6.
Tee Group Films "Advantages to Using Heat Activated Adhesive Films"—pp. 1-5.
Journal of Adhesion Science and Technology "Thermally Activated Pressure-Sensitive Adhesives" pp. 1-3.
Henkel—Opposition EP 3247758 (On;ine Filing) pp. 1-3.

\* cited by examiner

METALLOCENE POLYOLEFIN BASED LOW ACTIVATION TEMPERATURE HEAT SEAL HOT MELT ADHESIVE

FIELD OF THE INVENTION

This invention relates to a hot melt adhesive with low activation temperature heat seal capability which is typically coated onto films or foils used to package food and consumer goods. More specifically, it is related to a metallocene catalyzed polyolefin based hot melt which can either be pre-applied onto various films by converters or applied directly on packaging substrates or films in the production line using extrusion methods or other traditional coating methods. This invention provides good adhesion to many different packaging substrates or films at a low activation temperature.

BACKGROUND

Many different methods are used to seal packages. One of the common methods uses a Form, Fill and Seal machine which are extensively used in many packaging applications such as food packaging. Other methods involve placing the product into a plastic container and heat sealing a lid on the container. This includes packaging of liquid products, such as yogurt as well as dry products, for example single serve cereal packages. Other examples include heat sealing a lid onto the top of a frozen food microwave container.

The adhesive is typically pre-applied on the film and activated by heat at a certain temperature to seal the product inside the package or container. It is important to attain a high initial peel force to keep the container sealed immediately after filling so that the contents don't leak on the production line. The package also needs to remain securely sealed during further production and packaging steps and during shipment, display and storage.

The overall performance of the packaged end product is dependent on the packaging substrates or films and the sealing properties of the adhesives which comprise the package. One of the criteria for choosing suitable packaging materials is their ability to meet the demands of the manufacturing process and storage conditions. The film can made out of any suitable material, for example, polyethylene, polypropylene, polyester, nylon, etc. and can also be a multilayer laminate that incorporates paper, foil, metalized substrates, etc.

Recently, many packaging materials, especially the sealing films, are becoming thinner to lower cost and for aesthetic purposes. These films are thus becoming more heat sensitive and are susceptible to burn through at high activation temperatures (e.g. above 180° F.). In many lidding and flexible packaging applications, the machine operating conditions such as the platen temperature, heat seal area, heat seal pressure and dwell time are predetermined in the production line. The most preferred conditions are those with low platen temperature settings, low heat seal pressure and short dwell times so as to save energy, minimize scrap due to burn through and maximize line speed.

Many different types of adhesives are used for various heat sealing applications. They include water based and solvent borne heat seal adhesives. They also include thermoplastic polymeric materials that can be coextruded at the same time the film is manufactured or extruded onto the film afterwards. They can also take the form of a hot melt adhesive which can be coated on to the surface of the film directly after the film is extruded or shortly before the heat sealing process at the end user. Other factors involved in adhesive selection are cost, safety, F&DA clearance, etc.

Generally, these adhesives are pre-applied onto various films or foils by the film converter. The film or foil is typically coated on one surface of the web. One of the advantages of a hot melt adhesive over a water or solvent based adhesive is the speed of application on the production line and the elimination of drying ovens, solvent recovery systems, etc. In addition, hot melts can often be coated at faster line speeds since there is no solvent to evaporate.

Many of the extrudable heat seal hot melt adhesives used in packaging applications today are typically formulated with an ethylene vinyl acetate (EVA) polymer, wax, and polar tackifying resins such as rosin esters, or terpene phenolic resins. These type of EVA based adhesives are commonly used in lidding applications and are typically extruded onto a film such as clay coated paper, or a polyethylene (PE), or an orientated polypropylene (OPP). Also, these adhesives can be applied on paper or polyester film, and then heat sealed at a certain activation temperature to other various films (for example, polyvinylchloride (PVC), polyethylene terephthalate (PET), low density polyethylene (LDPE), or high density polyethylene (HDPE)) to form laminate films. EVA based hot melts are very effective in heat seal applications but their activation temperatures are generally above 180° F. to obtain good seal capability. In contrast, some lidding applications require lower heat seal activation temperatures starting at 160° F. while maintaining sufficient bond performance requirements of a minimum of about 1.0 pound per inch. Based on experimental data, the competitive EVA based hot melt available in the market today does not meet the desired low heat seal activation temperatures requirements at 160° F., as shown in Table 1 herein.

Extrusion is a process wherein plastic raw materials are melted into a homogeneous blend and formed into a continuous form. Raw materials such as polymers, resins, waxes, plasticizers and other additives are fed through a hopper into the extruder's heated barrel. A rotating screw pushes the material through the barrel as it is melted at anywhere from 350° F. to 500° F. depending on the polymer used in the mixture. There are different variations to the extrusion process depending upon what type of extrusion is being performed. Commercial films are generally made using either a blown film or a cast film process. Both of these can make single or multilayer films. Film extrusion is well known in the art.

Some film converters use the same die applicator head in making the film and to apply the adhesive onto the film in a multi-pass operation. The most preferred heat seal adhesives are those that are compatible with the polymer and resin components of the films, and those with very good thermal stability at high temperatures above 392° F. to avoid charring. Also, the most preferred adhesives are those with high viscosity at temperatures close to the temperature setting of the die head. This helps reduce downtime hours during film/adhesive conversion application or vice versa.

SUMMARY OF THE INVENTION

A low activation temperature heat seal hot melt adhesive for packaging applications based on a blend of metallocene catalyzed polyolefin polymer, tackifying resin, wax and other optional additives. In order to achieve the high viscosity suitable for an extrusion heat seal application, the adhesive composition of the invention is highly loaded with polymer, which is the highest molecular weight component in the hot melt adhesive formulation, and thus should have a viscosity of about 50,000 centipoise (cP) or more measured at a temperature of 300° F.

Accordingly, the hot melt adhesive composition contains about 50% to about 90% by weight of metallocene catalyzed polyolefin polymer (referred to herein as mPO), about 5% to about 50% by weight of tackifying resin, about 0.5% to about 40% by weight of wax, about 0.1% to about 5% by weight of a stabilizer or antioxidant, and 0% to about 25% by weight of optional additives. The hot melt adhesive composition should have an activation temperature of about 160° F. or less, and provide a minimum peel force of about 1.0 pound per inch, and preferably provide a minimum peel force of between about 1.0 to about 1.5 pounds per inch in order to meet the sealing performance requirements for packaging food and other consumer goods.

These adhesive compositions comprise a polyolefin polymer, or blend of polyolefin polymers, which is a copolymer based on ethylene or propylene and $C_4$ to $C_{10}$-alpha-olefins, obtained by metallocene-catalyzed polymerization, having a density of 0.900 g/cc or less (ASTM D792), a melt index of about 1 g/10 min to about 35 g/10 min (ASTM D1328, 10 min, 2.16 kg, at 190° C.) and a melt enthalpy of about 70 Joules/gram or less. Preferably, the polyolefin polymer should have a density of 0.890 g/cc or less, and more preferably a density of from about 0.86 g/cc to about 0.88 g/cc, a melt index of about 10 g/10 min to about 30 g/10 min, and a melt enthalpy of about 60 Joules/gram or less. The melt index and melt enthalpy properties of the polyolefin polymer are keys to the lower activation temperatures of the adhesive. Table 6 illustrates some of the metallocene polylolefin polymer examples that are included in this invention.

The tackifying resin is used to bring about the desired adhesion for the composition, and preferably is used in amounts of about 10% to about 40% by weight. The preferred tackifying resins are of the relatively non-polar type so as to be compatible with the mPO polymer and have softening points ranging from about 80° C. to about 140° C., and preferably from about 90° C. to about 130° C.

The wax component of the composition is used to control the set time of the hot melt adhesive as well as to control the flexibility and hardness of the hot melt adhesive. Preferably, the wax component is used in amounts of about 5% to about 30% by weight. The quantity of wax is such that the viscosity of the hot melt adhesive is adjusted to the desired degree while adhesion of the composition is not excessively affected in a negative manner.

DETAILED DESCRIPTION OF THE INVENTION

Figure 1:
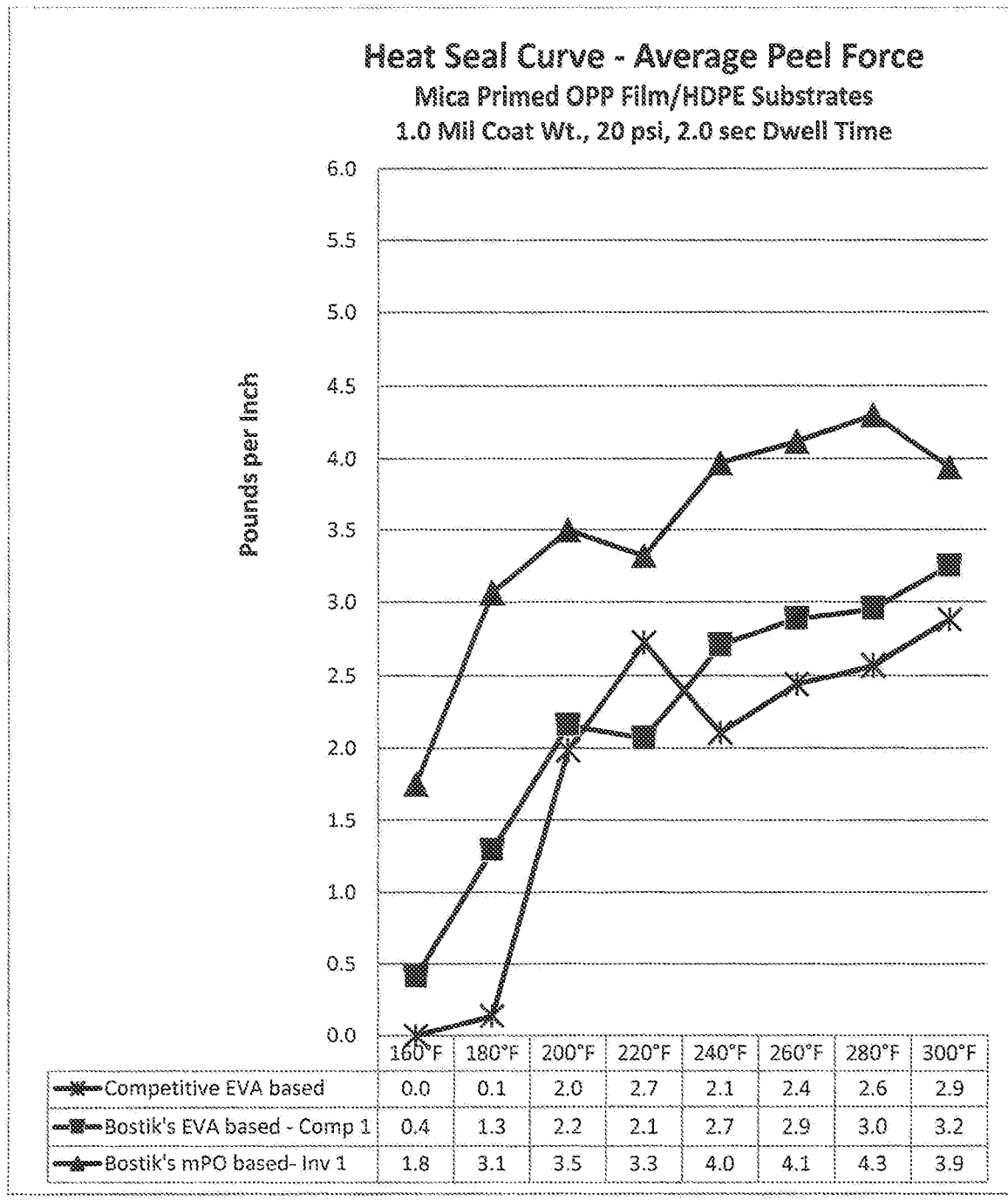
FIG. 1 is a graph of the average peel force versus sealing temperature for two different EVA based hot melt adhesive compositions as compared to an mPO based hot melt adhesive composition of the present invention.

The composition of the present invention includes about 50% to 90% by weight of a polyolefin polymer which is made by metallocene catalyzed polymerization. Preferably the composition includes about 55% to 80% by weight, and most preferably about 55% to 70% by weight of the metallocene catalyzed polyolefin polymer. The metallocene catalyzed polyolefin polymer functions to provide the formulation cohesive strength. It does this by providing a substantially linear storage modulus (G') throughout the service temperature range of from 0° C. to 80° C. The metallocene catalyst technology polyolefin polymers useful in the present invention are elastomeric polymers within a larger group of olefins. Olefins are unsaturated hydrocarbons and the most typical monomers used in polyolefins are ethylene and alpha-olefins containing up to ten carbon atoms. Principal olefin monomers include ethylene, propylene, butene-1,4-methylpentene, hexene, octene and combinations thereof. Polyolefins include ethylene polymers, propylene polymers, and combinations thereof including combinations with other $C_4$-$C_{10}$ alpha-olefins. Elastomeric polyolefins typically contain ethylene and propylene, and may contain other $C_4$-$C_{10}$ olefin monomer units. Some particularly preferred polyolefin polymers are copolymers of ethylene with at least one other olefin monomer, referred to as "ethylene-based" because the predominant monomer is ethylene such as ethylene-propylene copolymers and ethylene-octene copolymers, or copolymers of propylene and at least one other olefin monomer, referred to as "propylene based" because the predominant monomer is propylene, such as propylene-ethylene copolymers. The most preferred polyolefin is an ethylene/octene copolymer. Although any polymer falling in the range of properties herein described above can be used, preferred polyolefin polymers useful in this invention are available from Dow Chemical Co. under the trade name designation Engage or Versify, and from ExxonMobil Chemical under the trade name designation Vistamaxx, among others.

A tackifying resin, as defined in the present description, can be a molecule or a macro-molecule, generally a chemical compound or a fairly low molecular weight polymer, compared to common polymers, from a natural source or from a chemical process or combination thereof that in general enhances the adhesion of a final hot melt adhesive composition. The use of tackifying resins to impart adhesion can be assessed by using the same process conditions when applying and testing the adhesive, in order to compare different resins to each other.

Most common tackifying resins are obtained by polymerizing C5 or C9 streams from a petroleum feedstock, or combinations of them together or with other monomers, from natural sources or resulting from a chemical process. Tackifying resins from the C5 streams are called aliphatic resins, while those from the C9 stream or from pure monomers of C9 or C10 configuration or from derivatives or mixtures thereof are called aromatic resins. The C5 stream can be composed of linear or cyclic monomers, or combinations thereof. Also, an aliphatic resin can be obtained by hydrogenation of a polymerized aromatic feedstock. Hydrogenation can also be partial, so that part of the monomers keep their aromatic function in the polymer chain, while some become aliphatic. Any combination can be made in terms of monomer composition and hydrogenation process, in order to have aliphatic or aromatic resins, or to have any incremental point between a substantially aliphatic and a substantially aromatic tackifying resin. Also, an aromatic-modified aliphatic resin is a term that encompasses both cases when some quantity of C9 monomers are polymerized with a major part of C5 monomers, or when a C9 stream is polymerized, then hydrogenated in a way that most of the monomer's aromatic functions become aliphatic. Similarly, one would use the term aliphatic-modified aromatic resin when appropriate. Other types of monomers can enter into the composition of such resin's polymeric chain. Resins like terpene-based polymers, for example styrenated terpene resins, are part of the general description referred to herein as hydrocarbon resins, although terpenic monomers are not from petroleum derivatives but from natural sources. Rosin derivatives can be encompassed by the present resin description if one considers their aromatic character measured by a solvent cloud point test method called MMAP that would make them similar or at least comparable to an aromatic modified aliphatic resin. And last, a tackifying resin made substantially out of aromatic monomers can be called an aromatic resin and would be compatible with aromatic or polar compounds.

A material's softening point (SP) is defined in the present description by the Ring and Ball test method ASTM-E28-99, and aromatic character or aromatic content is defined either by the ratio in percent of hydrogen protons involved in an aromatic bond in the polymer chain, measured by standard $^1$H NMR analytical method, after dissolution for example in deuterium chloroform, or by a solvent cloud point test method called MMAP described in EP 0 802 251 A1. In the cloud point method, the temperature at which turbidity occurs is the cloud point value, when the resin is dissolved in a specific solvent. The lower the cloud point value, the more aromatic character the resin presents, relative to the chemistry of the resin. Usually, the percentage of aromatic protons is less than 0.5% for aliphatic resins, and is usually higher than 40% for aromatic resins. Any resin having an aromatic proton percent between 0.5% and 40% would be called either an aromatic-modified aliphatic tackifying resin or an aliphatic-modified aromatic tackifying resin, and would be considered as a mid-block tackifying resin.

The tackifying resin ingredient in the present composition may be incorporated entirely from a single resin grade, or may comprise a blend or mixture of two or more resins. The tackifying resins are preferably selected from aliphatic hydrocarbon resins and their hydrogenated derivatives like Eastotac H-130 available from Eastman Chemical, hydrogenated cycloaliphatic hydrocarbon resins like Escorez 5415 available from Exxon Mobil Chemical, aromatic modified aliphatic or hydrogenated cycloaliphatic resins like Escorez 5615 available from Exxon Mobil Chemical, aliphatic modified aromatic resins like Norsolene M1100 available from Sartomer-Cray Valley, partially or fully hydrogenated aromatic hydrocarbon resins like Regalite S7125 available from Eastman Chemical, polyterpene and styrenated polyterpene resins like Sylvares ZT 115 available from Arizona Chemical. The tackifying resins are more preferably selected from hydrogenated cycloaliphatic hydrocarbon resins, aromatic modified hydrogenated cycloaliphatic resins, aliphatic modified aromatic resins, partially or fully hydrogenated aromatic hydrocarbon resins, polyterpene and styrenated polyterpene resins. The tackifying resins are most preferably selected from aromatic modified hydrogenated cycloaliphatic resins, and partially hydrogenated aromatic hydrocarbon resins. The amount of resin used depends on the desired formulation and end use, but should be from about 5% to about 50% by weight, preferably from about 10% to about 40% by weight, and most preferably from about 15% to about 30% by weight. The preferred tackifying resins are of the relatively non-polar type so as to be compatible with the mPO polymer and have softening points ranging from about 80° C. to about 140° C., and preferably from about 90° C. to about 130° C.

Waxes can also be used in the adhesive composition, and are used to reduce the melt viscosity of the hot melt construction adhesives without appreciably decreasing their adhesive bonding characteristics. They also can be used to increase the blocking resistance of the coated substrate, which is important since the material will be stored in roll form until it is used in the packaging process. The roll cannot block under typical storage conditions (up to 140° F.) for prolonged periods. These waxes also are used to reduce the open time of the composition without affecting the temperature performance. The wax material component of the adhesive may comprise about 0.5% to about 40% by weight, preferably about 5% to about 35% by weight, and most preferably about 10% to about 25% by weight of the adhesive composition.

Among the useful wax materials are:
(1) Low molecular weight, that is, 100-6000 g/mol, polyethylene having a hardness value, as determined by ASTM method D-1321, of from about 0.1 to 120 and ASTM softening points of from about 66° C.° to 120° C.;
(2) Petroleum waxes such as paraffin wax having a melting point of from about 130° to 170° F. and microcrystalline wax having a melting point of from about 135° to 200° F., the latter melting points being determined by ASTM method D127-60;
(3) atactic polypropylene having a Ring and Ball softening point of from about 120° to 160° C.;
(4) metallocene catalyzed propylene-based wax like those commercialized by Clariant under the name "Licocene".
(5) metallocene catalyzed wax or single-site catalyzed wax like for example those described in U.S. Pat. Nos. 4,914,253, 6,319,979 or WO 97/33921 or WO 98/03603.
(6) synthetic waxes made by polymerizing carbon monoxide and hydrogen such as Fischer-Tropsch wax; and
(7) polyolefin waxes. As used herein, the term "polyolefin wax" refers to those polymeric or long-chain entities comprised of olefinic monomer units. These materials are commercially available from Eastman Chemical Co. under the trade name "Epolene." The materials which are preferred to use in the compositions of the present invention have a Ring and Ball softening point of 200° F. to 350° F. As should be understood, each of these waxes is solid at room temperature. Other useful substances include hydrogenated animal, fish and vegetable fats and oils such as hydrogenated tallow, lard, soy oil, cottonseed oil, castor oil, menhadin oil, cod liver oil, etc., and which are solid at ambient temperature by virtue of their being hydrogenated, have also been found to be useful with respect to functioning as a wax material equivalent. These hydrogenated materials are often referred to in the adhesives industry as "animal or vegetable waxes".

The preferred wax material is a paraffin wax having a melting point of 60° C. to 70° C., a hard wax such as Paraflint H1 commercialized by Sasol Wax or a Fischer Tropsch wax having a melting point of about 100° C. such as Bareco PX 100 commercialized by Baker Hughes, or a microcrystalline wax having a melting point of about 90° C. such as Microsere 5909F available from IGI, those hard waxes having a hardness dmm at 23° C. of about 2 dmm or less and a melting point of 75° C. to 120° C., or blends of a paraffin wax and a hard wax. The preferred hard wax has a melting point lower than 105° C. The term "hard wax" refers to any low molecular weight, highly crystalline ethylene-based polymer.

The adhesive also typically includes a stabilizer or antioxidant in amounts of from about 0.1% to about 5% by weight of the composition. The stabilizers which are useful in the hot melt adhesive compositions of the present invention are incorporated to help protect the polymers noted above, and thereby the total adhesive system, from the effects of thermal and oxidative degradation which normally occurs during the manufacture and application of the adhesive as well as in the ordinary exposure of the final product to the ambient environment. Such degradation is usually manifested by a deterioration in the appearance, physical properties and performance characteristics of the adhesive. A particularly preferred antioxidant is Irganox 1010, a tetrakis(methylene(3,5-di-teri-butyl-4-hydroxyhydrocinnamate))methane manufactured by Ciba-Geigy. Among the applicable stabilizers are high molecular weight hindered phenols and multifunctional phenols, such as sulfur and phosphorus-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency and correspondingly, its reactivity; this steric hindrance thus providing the phenolic compound with its stabilizing properties. Representative hindered phenols include:

1,3,5-trimethyl-2,4,6-tris(3-5-di-tert-butyl-4-hydroxybenzyl)benzene;
pentaerythritol tetrakis-3(3,5-di-tert-butyl-4-hydroxyphenyl) propionate;
n-octadecyl-3(3,5-ditert-butyl-4-hydroxyphenyl) propionate;
4,4'-methylenebis(4-methyl-6-tert butylphenol);
4,4'-thiobis(6-tert-butyl-o-cresol);
2,6-di-tert-butylphenol;
6-(4-hydroxyphenoxy)-2,4-bis(n-ocytlthio)-1,3,5-triazine;
2,4,6-tris(4-hydroxy-3,5-di-tert-butyl-phenoxy)-1,3,5-triazine;
di-n-octadecyl-3,5-di-tert-butyl-4-hydroxybenzylphosphonate;
2-(n-octylthio)ethyl-3,5-di-tert-butyl-4-hydroxybenzoate; and
sorbitol hexa-(3,3,5-di-tert-butyl-4-hydroxy-phenyl) propionate.

The performance of these stabilizers may be further enhanced by utilizing, in conjunction therewith; (1) synergists such as, for example, as thiodipropionate esters and phosphites; and (2) chelating agents and metal deactivators as, for example, ethylenediaminetetraacetic acid, salts thereof, and disalicylalpropylenediimine.

Optional additives may be incorporated into the adhesive composition in order to modify particular physical properties in amounts of from 0% to about 25% by weight. These additives may include colorants, such as titanium dioxide and fillers such as talc and clay, crosslinking agents, nucleating agents, reactive compounds, fire-retardant mineral or organic agents, as well as ultraviolet light (UV) absorbing agents and UV fluorescing agents.

The adhesive composition useful in the method of the present invention may be produced using any of the techniques known in the art. A representative example of the procedure involves placing all of the substances, in a jacketed mixing kettle, and preferably in a jacketed heavy duty mixer of the Baker-Perkins or Day type, and which is equipped with rotors, and thereafter raising the temperature of this mixture to a range of 120° C. to 177° C. It should be understood that the precise temperature to be used in this step would depend on the melting points of the particular ingredients. The resulting adhesive composition is agitated until the polymers completely dissolve. A vacuum is then applied to remove any entrapped air.

Various methods are conventionally used to coat a hot melt adhesive on a substrate. This can be made by roll coating or any printing type method, or by slot coating, by extrusion or by spray gun. Spray gun techniques are numerous and can be done with or without assistance of compressed air that would shape the adhesive spray, and consequently the adhesive pattern. The hot melt adhesive material is generally allowed to melt in tanks, and then pumped through hoses to the final coating spot on the substrates. For the present invention, the preferred method of applying the adhesive on a substrate would be by an extrusion application, most preferably coextrusion of the substrate and adhesive to form a laminate. Preferably, the hot melt adhesive is coextruded with the film during film production.

To be suitable for coextrusion, the viscosity of the adhesive material measured at 300° F. needs to be generally higher than 50,000 centipoise (cP), more preferably higher than 75,000 centipoise (cP), and most preferably higher than 100,000 centipoise (cP) in order to achieve the right pattern and consequently the correct substrate bonding performances. If the viscosity of the adhesive is too low, no continuous molten adhesive coating is obtained on the substrate during coextrusion resulting in a defective laminate. Line speed, add-on levels as well as open time, set time, compression forces and compression time are also process control parameters.

The coextruded laminate comprised of the film substrate and coating of the present adhesive composition should be suitable as a heat-sealing layer or lid for a food container or package. To this end, the substrate film is preferably a clay coated paper, a polyvinylchloride (PVC) film, a polyester film, aluminum foil, a nylon film, or a polyolefin film, in particular polyethylene (PE) or polypropylene (PP) films such as orientated polypropylene (OPP), polyethylene terephthalate (PET), low density polyethylene (LDPE) or high density polyethylene (HDPE). In the food processing industry, containers are molded from various plastic materials and are heat sealed with the laminate of the present invention as a lid for such containers once they have been filled with the product to be packaged. As noted herein, this heat sealing operation preferably occurs at 160° F., and thus the adhesive of the present invention must have an activation temperature of 160° F. or less.

The raw materials used in the examples are the following:

| Name | Type | Supplier |
|---|---|---|
| Waxes | | |
| Paraffin Wax 150-152 | Paraffin Wax | Various Suppliers |
| Bareco PX100 Wax | Fischer-Tropsch | Baker Hughes |
| Microsere 5909F | Microcrystalline Wax | IGI |
| Tackifying Resins | | |
| Eastotac H115L | Hydrogenated Aliphatic Hydrocarbon resin | Eastman |
| Eastotac H130R | Partially Hydrogenated Aliphatic Hydrocarbon resin | Eastman |
| Wingtack Extra | Aromatic modified C5 Hydrocarbon resin | Cray Valley USA, LLC |
| Resinall 1000 | Hydrogenated cycloaliphatic Hydrocarbon resin | Resinall |
| Olefin Polymers | | |
| Engage 8407 | Ethylene-Octene copolymer | Dow |
| Engage 8137 | Ethylene-Octene copolymer | Dow |
| Engage 8402 | Ethylene-Octene copolymer | Dow |
| Antioxidant | | |
| Irganox 1010 | Hindered Phenol | Ciba Specialty |

| Raw Material | Physical Properties & Test Methods | |
|---|---|---|
| Waxes | Congealing Point | |
| Paraffin Wax 150-152 | 66.0° C. | ASTM D-87 |
| Bareco PX100 | 100.0° C. | ASTM D-938 |
| Microsere 5909F | 90.0° C. | ASTM D-127 |
| Tackifying Resins | Ring & Ball Softening Point, ° C. | |
| Eastotac H115L | 110.0-120.0° C. | ASTM E28 |
| Eastotac H130R | 125.0-135.0° C. | ASTM E28 |
| Wingtack Extra | 94.0-100.0° C. | ISO 4625 |
| Resinall 1000 | 95.0-105.0° C. | RTM - 100 |

| Olefin Polymer | Density, g/cm | | Melt Index | |
|---|---|---|---|---|
| Engage 8407 | 0.870 g/cm$^3$ | ASTM D792 | 30.0 g/10 min (190° C./2.16 Kg) | ASTM D1238 |
| Engage 8137 | 0.864 g/cm$^3$ | ASTM D792 | 13.0 g/10 min (190° C./2.16 Kg) | ASTM D1238 |
| Engage 8402 | 0.902 g/cm$^3$ | ASTM D792 | 30.0 g/10 min (190° C./2.16 Kg) | ASTM D1238 |

| Antioxidant | Flash Point, °C. | Melting Range (°C.) |
|---|---|---|
| Irganox 1010 | 297 | 110-125 |

Film/Substrate Description and Sample Preparation

The substrate/film is made using a clay coated paper/PE/OPP/Primer laminate. The adhesive is applied onto the primed side of the film through a slot coat application, 1.0 mil thick and at 375° F.-400° F. depending on the viscosity of the adhesive. The laminate film with adhesive was cut into 1.0 inch width samples. Then, a 1.0×1.0 inch area is heat activated onto HDPE film (or other substrate as noted) using the temperature indicated at 20 psi and 2.0 seconds dwell time using a Sentinel heat sealer. Test samples were conditioned in a controlled environment (72° F., 50% RH) for 15-30 minutes prior to running a 180 Degree Peel Test at 12.0 inches per minute crosshead speed using an Instron Tensile Tester.

Examples

Bostik's analysis showed that the adhesive composition of the Competitive adhesive from Henkel, Proxmelt E4090 is based on polyethylene wax, terpene resin, and ethylene vinylacetate (EVA) polymer and is close to the adhesive composition of Bostik's Comp 1. FIG. 1 illustrates that the Competitive adhesive's activation temperature is above 180° F. and is higher compared to the heat activation temperature of Bostik's Comp 1. The thermal properties of the adhesives shown in Table 1 directly correlated to their heat activation temperature. Although, they have similar melt peak temperatures, they differ significantly on their melt enthalpies. Therefore, the Competitive adhesive requires much higher energy to melt the adhesive as compared to Bostik Comp 1.

The minimum standard initial peel force requirement for most lidding applications is at least about 1.0 pound per inch, and the minimum is preferably between about 1.0 to about 1.5 pounds per inch, depending on the size of the package to prevent leakage in the production fill area. As shown in FIG. 1, the Competitive adhesive has a higher heat seal activation temperature, which is above 180° F., in order to obtain the desired minimum initial peel force of at least 1.0 pound per inch. As a result, and as illustrated in FIG. 1, the Competitive adhesive has inadequate peel force at 160-180° F. Although, Bostik's Comp 1 has slightly lower activation temperature than the Competitive sample, its peel force value is still also below the industry's target requirements of 1.0 pound per inch, or greater, at 160° F.

As shown in Table 1, Bostik's EVA based (Comp 1) and Bostik's mPO based (Inv 1) used tackifying resin in the formulation that is more compatible or suitable to the polymer system. Composition 1 used Sylvalite RE100L, a rosin ester resin which is very compatible to an EVA polymer with higher % vinyl acetate (abbreviated as VA in Table 1) (26-28% Vinyl Acetate). Invention 1 uses Wingtack Extra, a non-hydrogenated aromatic modified-aliphatic resin, which is compatible to the polyolefin polymer. As shown in Table 5, the thermal properties of an EVA and mPO polymers used in Comp 1 and Inv. 1 directly correlated to the thermal properties of the adhesives resulting to Comp 1 having slightly higher melt peak and melt enthalpy as compared to Inv 1. Therefore, Comp 1 requires slightly higher temperature and slightly higher energy to bond the films together as illustrated in FIG. 1. Also, the peel force of Inv 1 across the temperatures tested is much higher than the industry's minimum standard requirements. This will allow the converters to reduce their coat weight level below 1.0 mil and still meet the minimum target requirement of 1.0 pound per inch for good sealability.

TABLE 1

EVA and metallocene based Formulation

| Supplier | Raw Material Name | Competitive EVA based | Comp 1 | Inv 1 |
|---|---|---|---|---|
| Various suppliers | Paraffin Wax 150-152 | | 15 | 15 |
| Arizona Chemicals | Sylvalite RE100L | | 25 | |
| Cray Valley USA | Wingtack Extra | | | 25 |
| Various suppliers | EVA, 28% VA, 150 MI | | 34.5 | |
| Various suppliers | EVA, 26% VA, 3.0 MI | | 25 | |
| Dow Chemical Co. | Engage 8407 | | | 59.5 |
| BASF | Irganox 1010 | | 0.5 | 0.5 |
| | Total (%) | | 100 | 100 |
| | Viscosity at 300° F. (cP) | 68,000 | 89,500 | 109,000 |
| | Viscosity at 325° F. (cP) | | 56,600 | 72,000 |
| | Viscosity at 350° F. (cP) | | 37,500 | 50,400 |
| | Viscosity at 375° F. (cP) | | 27,600 | 33,800 |
| | R&B Softening Point | | 187° F. | 181° F. |
| | Melt Peak, °C. | 65.6 | 66.3 | 62.5 |
| | Melt Enthalpy, J/g | 90.4 | 54.0 | 47.1 |

TABLE 2

Various Waxes and Properties

| Supplier | Raw Material Name | Inv 1 | Inv 2 | Inv 3 |
|---|---|---|---|---|
| Various suppliers | Paraffin Wax 150-152 | 15 | | |
| Baker Hughes | Bareco PX100 | | 15 | |
| IGI | Microsere 5909F | | | 15 |
| Cray Valley USA | Wingtack Extra | 25 | 25 | 25 |
| Dow Chemical Co. | Engage 8407 | 59.5 | 59.5 | 59.5 |
| BASF | Irganox 1010 | 0.5 | 0.5 | 0.5 |
| | Total (%) | 100 | 100 | 100 |
| | Viscosity at 300° F. (cP) | 109,000 | | |
| | Viscosity at 325° F. (cP) | 72,000 | | |
| | Viscosity at 350° F. (cP) | 50,400 | 57,100 | |
| | Viscosity at 375° F. (cP) | 33,800 | 40,500 | 41,350 |
| | Viscosity at 400° F. (cP) | | 29,750 | 29,950 |
| | R&B Softening Point | 181° F. | 220° F. | 199° F. |
| | Melt Peak, ° C. | 62.5 | 78.6, 100.3 | 60.7 |
| | Melt Enthalpy, J/g | 47.1 | 57.23 | 47.8 |

Wax is typically used as diluents in hot melt adhesive formulation. However, it controls the set-up speed, flexibility and hardness of the adhesive depending on the type of waxes used and its properties. Table 2 shows three (3) different types of waxes used with different softening points. Also, these three (3) waxes have different thermal properties (melt peaks and melt enthalpy) as shown in Table 5. Invention 1 uses a Paraffin wax with 150° F. (65.5° C.) softening point; Invention 2 uses a Fischer Tropsch wax with 212° F. (100° C.) softening point; and Invention 3 uses a microcrystalline wax with 194° F. (90° C.) softening point. The resulting viscosities and softening points of Inv 2 and 3 formulae are expected to be higher because they used higher molecular weight and higher softening point waxes in their formulations as compared to Inv. 1.

Figure 2:
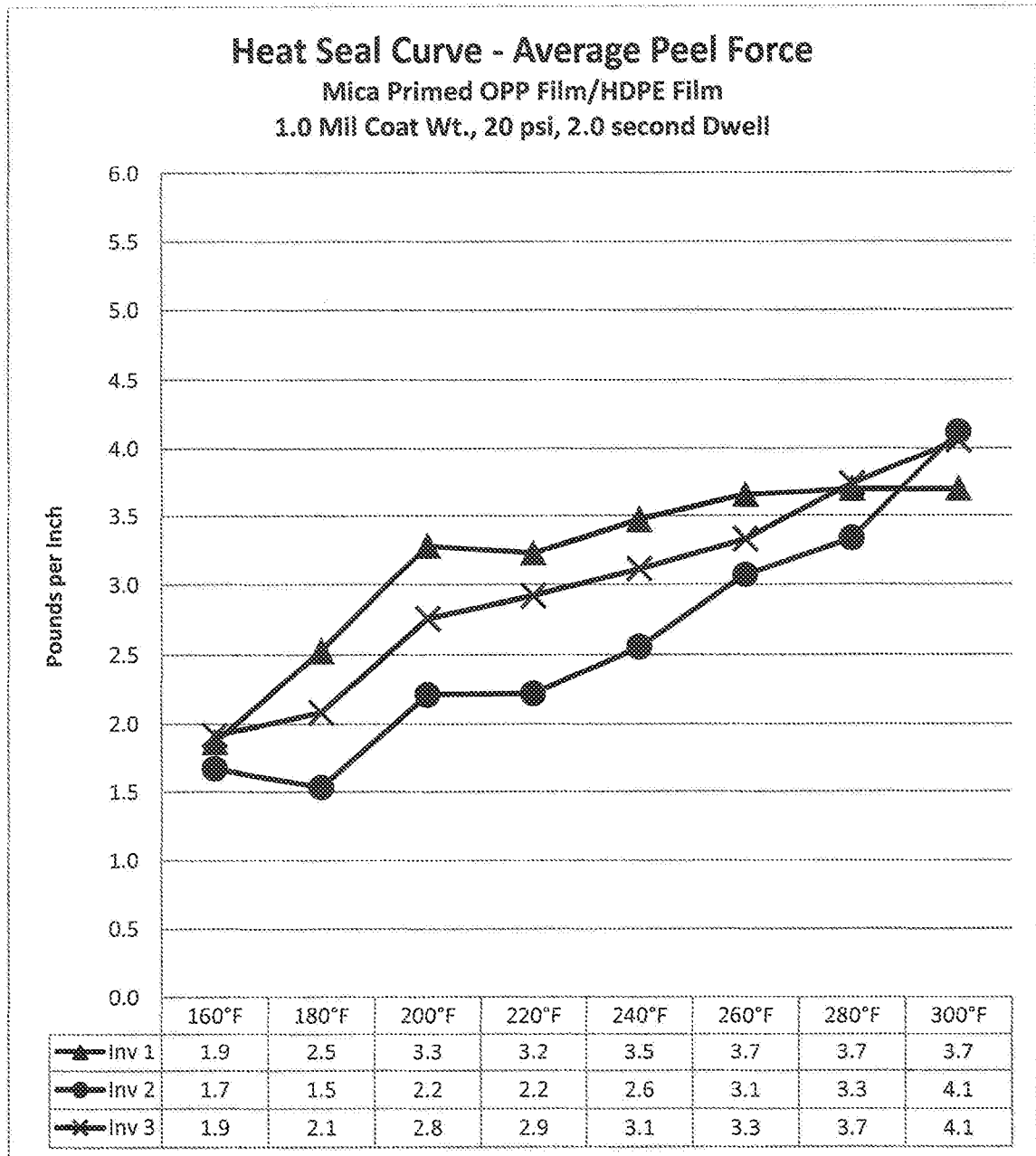
FIG. 2 is a graph of the average peel force versus sealing temperature for three different mPO based hot melt adhesive compositions of the present invention each of which used a different wax ingredient as set forth in Table 2.
Figure 3:
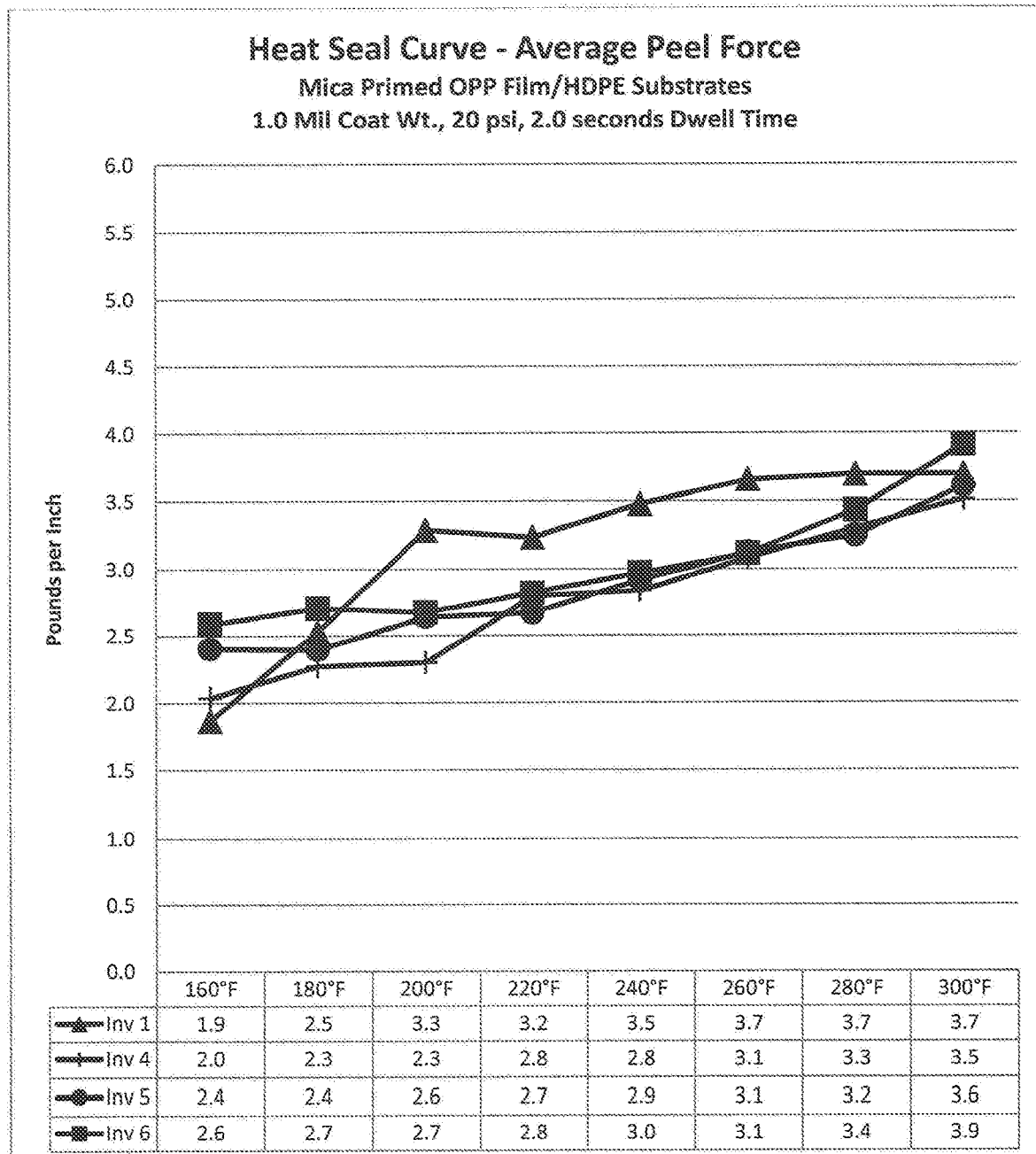
FIG. 3 is a graph of the average peel force versus sealing temperature for four different mPO based hot melt adhesive compositions of the present invention each of which used a different tackifying resin as set forth in Table 3.
Figure 4:
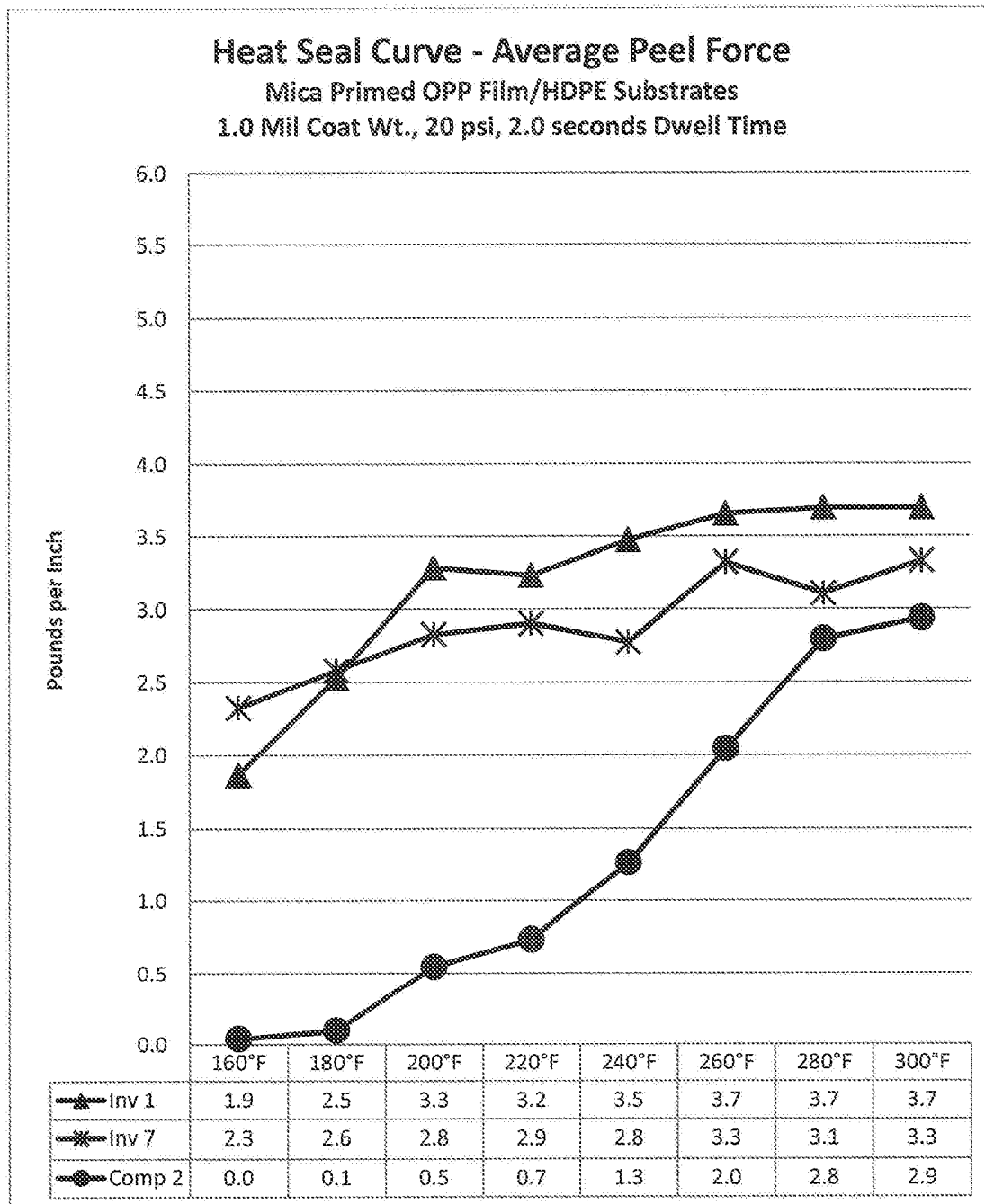
FIG. 4 is a graph of the average peel force versus sealing temperature for two different mPO based hot melt adhesive compositions of the present invention as compared to a third mPO based composition using an mPO polymer having too high melt enthalpy.
Figure 5:
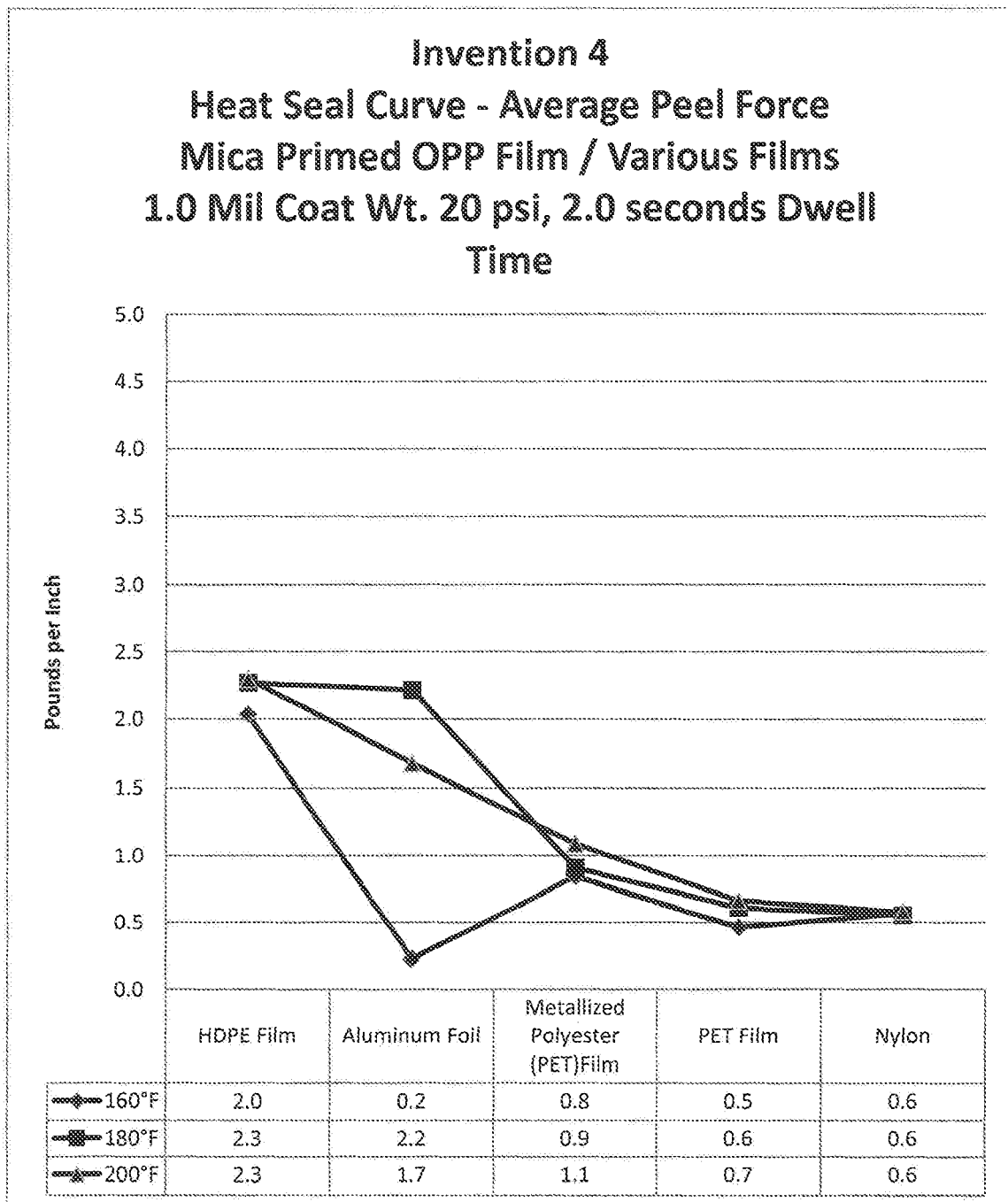
FIG. 5 is a graph of the average peel force versus sealing temperature for Inventive Example 4, as set forth in Table 3, on various film substrates.

In FIG. 2, the heat seal capacity of Inv 1, 2 and 3 are illustrated to be above the industry's initial peel force or seal requirements of 1.0 to 1.5 pounds per inch.

TABLE 3

High vs. Low Softening Point Tackifying Resins and Properties

| Supplier | Raw Material Name | Inv 1 | Inv 4 | Inv 5 | Inv 6 |
|---|---|---|---|---|---|
| Various suppliers | Paraffin Wax 150-152 | 15 | 15 | 15 | 15 |
| Cray Valley USA | Wingtack Extra | 25 | | | |
| Resinall Corp | Resinal 1000 | | 25 | | |
| Eastman Chemicals | Eastotac H115L | | | 25 | |
| Eastman Chemicals | Eastotac H130R | | | | 25 |
| Dow Chemical Co. | Engage 8407 | 59.5 | 59.5 | 59.5 | 59.5 |
| BASF | Irganox 1010 | 0.5 | 0.5 | 0.5 | 0.5 |
| | Total (%) | 100 | 100 | 100 | 100 |
| | Viscosity at 300° F. (cP) | 109,000 | | | |
| | Viscosity at 325° F. (cP) | 72,000 | | | |
| | Viscosity at 350° F. (cP) | 50,400 | | | |
| | Viscosity at 375° F. (cP) | 33,800 | 40,700 | 39,550 | 42,700 |
| | Viscosity at 400° F. (cP) | | 30,100 | 29,100 | 31,550 |
| | R&B Softening Point | 181° F. | 183° F. | 179° F. | 183° F. |
| | Melt Peak, ° C. | 62.5 | 60.5 | 60.4 | 60.6 |
| | Melt Enthalpy, J/g | 47.1 | 55.6 | 56.6 | 57.1 |

TABLE 4

Metallocene Polyolefin Polymer and Properties

| Supplier | Raw Material Name | Inv 1 | Inv 7 | Comp 2 |
|---|---|---|---|---|
| Various suppliers | Paraffin Wax 150-152 | 15 | 15 | 15 |
| Cray Valley USA | Wingtack Extra | 25 | 25 | 25 |
| Dow Chemical Co. | Engage 8407 | 59.5 | | |
| Dow Chemical Co. | Engage 8137 | | 59.5 | |
| Dow Chemical Co. | Engage 8402 | | | 59.5 |
| BASF | Irganox 1010 | 0.5 | 0.5 | 0.5 |
| | Total (%) | 100 | 100 | 100 |
| | Viscosity at 300° F. (cP) | 109,000 | | |
| | Viscosity at 325° F. (cP) | 72,000 | | |
| | Viscosity at 350° F. (cP) | 50,400 | | |
| | Viscosity at 375° F. (cP) | 33,800 | 81,600 | 42,600 |

TABLE 4-continued

Metallocene Polyolefin Polymer and Properties

| Supplier | Raw Material Name | Inv 1 | Inv 7 | Comp 2 |
|---|---|---|---|---|
| | Viscosity at 400° F. (cP) | | 59,800 | 31,150 |
| | R&B Softening Point | 181° F. | 188° F. | 223° F. |
| | Melt Peak, ° C. | 62.5 | 61.0 | 58.7, 92.7 |
| | Melt Enthalpy, J/g | 47.1 | 51.0 | 90.4 |

TABLE 5

Thermal Properties Comparison by DSC (ASTM D3418-03)

| | Melt Peak, ° C. | Melt Enthalpy, Joules/Grams |
|---|---|---|
| Paraffin wax 150-152 | 66.2 | 201.2 |
| Bareco PX100 | 88.7, 105.7 | 235.4 |
| Microsere 5909F | 65.9, 86.7 | 174.2 |
| EVA, 28% VA, 150 MI | 61.8 | 52.7 |
| EVA, 26% VA, 3.0 MI | 73.0 | 62 |
| Engage 8407 | 60.7 | 55.7 |
| Engage 8137 | 54.1 | 46.1 |
| Engage 8402 | 76.6, 99.7 | 97.3 |

TABLE 6

Physical & Thermal Properties of Engage Polymers

| | Density ASTM D792 | Melt Index (g/10 min) ASTM D1238 (190° C./2.16 kg) | Melting Temperature DSC - Dow Method |
|---|---|---|---|
| Engage 8407 | 0.870 | 30 | 140° F. (60° C.) |
| Engage 8137 | 0.864 | 13 | 133° F. (56° C.) |
| Engage 8402 | 0.902 | 30 | 205° F. (96° C.) |

The invention claimed is:

1. A low activation temperature hot melt adhesive for packaging applications, comprising:
   a) about 50% to about 90% by weight of a metallocene catalyzed polyolefin polymer having: a density of 0.900 g/cc or less according to ASTM D792; a melt enthalpy of 70 Joules/gram or less; and a melt index of 1 g/10 min to 35 g/10 min as measured in accordance with ASTM D1238 for 10 min with a weight of 2.16 kg, and at 190° C.;
   b) about 5% to about 50% by weight of a tackifying resin;
   c) about 0.5% to about 40% by weight of a wax, wherein the wax is selected from the group consisting of a paraffin wax having a melting point between about 130° F. to about 170° F., a microcrystalline wax having a melting point between about 135° F. to about 200° F., and a hard wax having a melting point below about 105° C., wherein the melting point is determined by ASTM method D127-60;
   d) about 0.1% to about 5% by weight of a stabilizer or antioxidant; and
   wherein the adhesive has an activation temperature of 160° F. or less, and has a viscosity of greater than 50,000 centipoise at 300° F.

2. The hot melt adhesive of claim 1 wherein the metallocene catalyzed polyolefin polymer is a copolymer of ethylene with $C_4$ to $C_{10}$-alpha-olefins.

3. The hot melt adhesive of claim 2 wherein the metallocene catalyzed polyolefin polymer is an ethylene/octene copolymer.

4. The hot melt adhesive of claim 1 comprising about 55% to about 70% by weight of the metallocene catalyzed polyolefin polymer.

5. The hot melt adhesive of claim 1 wherein the tackifying resin has a softening point of from about 80° C. to about 140° C.

6. The hot melt adhesive of claim 5 wherein said tackifying resin is a non-polar tackifying resin.

7. The hot melt adhesive of claim 1 comprising about 5% to about 30% by weight of the wax.

8. The hot melt adhesive of claim 7 wherein said wax is the paraffin wax.

9. An article comprising the adhesive of claim 1.

10. The article of claim 9 which is a multilayer film laminate.

11. The article of claim 10 wherein one layer of said laminate is a polyolefin film.

12. The article of claim 11 wherein said polyolefin film is a polyethylene film.

13. The article of claim 9 which is a foodstuffs package.

14. The hot melt adhesive of claim 1 wherein the metallocene catalyzed polyolefin polymer comprises the highest molecular weight component in the hot melt adhesive.

15. A low activation temperature hot melt adhesive for packaging applications, consisting essentially of:
   a) about 50% to about 90% by weight of a metallocene catalyzed polyolefin polymer having: a density of 0.900 g/cc or less according to ASTM D792; a melt enthalpy of 70 Joules/gram or less; and a melt index of 1 g/10 min to 35 g/10 min as measured in accordance with ASTM D1238 for 10 min with a weight of 2.16 kg, and at 190° C.;
   b) about 5% to about 50% by weight of a tackifying resin;
   c) about 0.5% to about 40% by weight of a wax, wherein the wax is selected from the group consisting of a paraffin wax having a melting point between about 130° F. to about 170° F., a microcrystalline wax having a melting point between about 135° F. to about 200° F., and a hard wax having a melting point below about 105° C., wherein the melting point is determined by ASTM method D127-60;
   d) about 0.1% to about 5% by weight of a stabilizer or antioxidant; and
   e) 0 to 25% by weight of additives selected from colorants, fillers, crosslinking agents, nucleating agents, reactive compounds, fire-retardant mineral or organic agents, ultraviolet light (UV) absorbing agents and UV fluorescing agents;
   wherein the adhesive has an activation temperature of 160° F. or less, and has a viscosity of greater than 50,000 centipoise at 300° F.

16. The hot melt adhesive of claim 1 comprising about 55% to about 80% by weight of the metallocene catalyzed polyolefin polymer.

17. The hot melt adhesive of claim 1 wherein the weight of the tackifying resin comprises about 10% to about 40%.

18. The hot melt adhesive of claim 15 wherein the metallocene catalyzed polyolefin polymer comprises the highest molecular weight component in the hot melt adhesive.

* * * * *